(12) United States Patent
Li et al.

(10) Patent No.: US 9,826,546 B2
(45) Date of Patent: Nov. 21, 2017

(54) METHOD AND APPARATUS FOR TRANSMITTING HARQ INDICATION INFORMATION

(71) Applicant: Samsung Electronics Co., Ltd., Gyeonggi-do (KR)

(72) Inventors: Yingyang Li, Beijing (CN); Naizheng Zheng, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 144 days.

(21) Appl. No.: 14/439,586

(22) PCT Filed: Nov. 4, 2013

(86) PCT No.: PCT/KR2013/009902
§ 371 (c)(1),
(2) Date: Apr. 29, 2015

(87) PCT Pub. No.: WO2014/069958
PCT Pub. Date: May 8, 2014

(65) Prior Publication Data
US 2015/0305059 A1    Oct. 22, 2015

(30) Foreign Application Priority Data

Nov. 2, 2012 (CN) .......................... 2012 1 0432121

(51) Int. Cl.
*H04W 72/12* (2009.01)
*H04L 1/00* (2006.01)
(Continued)

(52) U.S. Cl.
CPC ....... *H04W 72/1278* (2013.01); *H04L 1/0026* (2013.01); *H04L 1/1812* (2013.01);
(Continued)

(58) Field of Classification Search
CPC H04W 72/1278; H04W 72/14; H04L 1/0026; H04L 1/1812; H04L 1/1861;
(Continued)

(56) References Cited

U.S. PATENT DOCUMENTS

2009/0196240 A1    8/2009    Frederiksen et al.
2010/0322165 A1    12/2010   Yoo
(Continued)

FOREIGN PATENT DOCUMENTS

| CN | 102546134 | 7/2012 |
|----|-----------|--------|
| WO | WO 2009129343 | 10/2009 |
| WO | WO 2012/098827 | 7/2012 |

OTHER PUBLICATIONS

European Search Report dated Jun. 7, 2016 issued in counterpart application No. 13851395.7-1851, 6 pages.
PCT/ISA/210 Search Report issued on PCT/KR2013/009902 (pp. 4).

*Primary Examiner* — Chi H Pham
*Assistant Examiner* — Weibin Huang
(74) *Attorney, Agent, or Firm* — The Farrell Law Firm, P.C.

(57) ABSTRACT

A method and an apparatus for transmitting Hybrid Automatic Repeat reQuest (HARQ) indication information are provided. The method includes transmitting, by a UE, uplink data on a Physical Uplink Shared CHannel (PUSCH) according to scheduling of a base station; detecting, by the UE, a new UpLink (UL) grant and enhanced Physical HARQ Indication CHannel (ePHICH) information of the base station for the uplink data according to a synchronous HARQ timing relationship, wherein ePHICH resources used for bearing the ePHICH information are mapped to a portion of time-frequency resources of a distributed enhanced Physical Downlink Control CHannel (ePDCCH) set; and if the UL grant is not detected, the UE retransmitting the uplink
(Continued)

data or not transmitting the uplink data according to an indication of the ePHICH information.

26 Claims, 12 Drawing Sheets

(51) Int. Cl.
*H04L 1/18* (2006.01)
*H04L 27/26* (2006.01)
*H04W 72/14* (2009.01)
*H04L 5/00* (2006.01)

(52) U.S. Cl.
CPC .......... *H04L 1/1861* (2013.01); *H04L 1/1887* (2013.01); *H04L 5/0048* (2013.01); *H04L 5/0053* (2013.01); *H04L 5/0055* (2013.01); *H04L 27/2613* (2013.01); *H04W 72/14* (2013.01)

(58) Field of Classification Search
CPC ... H04L 1/1887; H04L 5/0048; H04L 5/0053; H04L 5/0055; H04L 27/2613
See application file for complete search history.

(56) References Cited

U.S. PATENT DOCUMENTS

| | | |
|---|---|---|
| 2011/0103334 A1 | 5/2011 | Lee et al. |
| 2011/0103335 A1* | 5/2011 | Golitschek Edler von Elbwart ................ H04L 1/0026 370/329 |
| 2012/0120908 A1 | 5/2012 | Ahn et al. |
| 2012/0250663 A1 | 10/2012 | Han et al. |
| 2013/0235812 A1* | 9/2013 | Heo ........................ H04L 5/001 370/329 |
| 2013/0235821 A1* | 9/2013 | Chen ................. H04W 72/0406 370/329 |
| 2013/0242882 A1* | 9/2013 | Blankenship ....... H04W 72/042 370/329 |
| 2014/0133590 A1* | 5/2014 | Ahn ...................... H04W 48/12 375/260 |
| 2015/0289234 A1 | 10/2015 | Zhao et al. |

* cited by examiner

| 0 | 12 | 8 | 4 | 0 | | | 8 | 4 | 0 | 12 | 8 | |
|---|---|---|---|---|---|---|---|---|---|---|---|---|
| 1 | 13 | 9 | 5 | 1 | | | 9 | 5 | 1 | 13 | 9 | |
| 2 | 14 | 10 | 6 | 2 | 12 | 2 | 10 | 6 | 2 | 14 | 10 | 4 | 10 |
| 3 | 15 | 11 | 7 | 3 | 13 | 3 | 11 | 7 | 3 | 15 | 11 | 5 | 11 |
| 4 | 0 | 12 | 8 | 4 | 14 | 4 | 12 | 8 | 4 | 0 | 12 | 6 | 12 |
| 5 | 1 | 13 | 9 | 5 | | | 13 | 9 | 5 | 1 | 13 | |
| 6 | 2 | 14 | 10 | 6 | | | 14 | 10 | 6 | 2 | 14 | |
| 7 | 3 | 15 | 11 | 7 | 15 | 5 | 15 | 11 | 7 | 3 | 15 | 7 | 13 |
| 8 | 4 | 0 | 12 | 8 | 0 | 6 | 0 | 12 | 8 | 4 | 0 | 8 | 14 |
| 9 | 5 | 1 | 13 | 9 | 1 | 7 | 1 | 13 | 9 | 5 | 1 | 9 | 15 |
| 10 | 6 | 2 | 14 | 10 | | | 2 | 14 | 10 | 6 | 2 | |
| 11 | 7 | 3 | 15 | 11 | | | 3 | 15 | 11 | 7 | 3 | |

Subcarrier (vertical axis)

Slot 0     Slot 1

FIG.4
(PRIOR ART)

METHOD AND APPARATUS FOR TRANSMITTING HARQ INDICATION INFORMATION

PRIORITY

This application is a U.S. National Stage Entry of International Application PCT/KR2013/009902, filed on Nov. 4, 2013, which claims priority to Chinese Application No. 201210432121.4, filed on Nov. 2, 2012, the contents of which are incorporated herein by reference.

BACKGROUND OF THE INVENTION

1. Field of the Invention

The present invention relates generally to radio communications techniques, and more particularly, to a method and an apparatus for transmitting Hybrid Automatic Repeat reQuest (HARQ) indication information.

2. Description of the Related Art

In $3^{rd}$ Generation Partnership Project (3GPP) Long-Term Evolution (LTE)/LTE-Advanced systems, each radio frame has a length of 10 ms which is equally divided into 10 subframes. One downlink Transmission Time Interval (TTI) is defined for each subframe. FIG. 1 is a diagram illustrating a frame structure of a Frequency Division Duplexing (FDD) system. Each downlink subframe is formed of two slots. For a normal Cyclic Prefix (CP), each slot includes 7 Orthogonal Frequency Division Multiplexing (OFDM) symbols. For an extended CP, each slot includes 6 OFDM symbols. FIG. 2 shows a frame structure of a Time Division Duplexing (TDD) system. Each radio frame is equally divided into two half frames with a length of 5 ms. Each of subframe 1 and subframe 6 respectively includes 3 special fields, i.e., a Downlink Pilot Time Slot (DwPTS), a Guard Period (GP), and an Uplink Pilot Time Slot (UpPTS). The total length of the three special fields is 1 ms.

FIG. 3 is a diagram illustrating a structure of a downlink subframe of an LTE system. OFDM symbols (n=1, 2, or 3) at the forefront of the downlink subframe belong to a downlink control channel area and are used for transmitting user downlink control information including a Physical Downlink Control CHannel (PDCCH), a Physical Control Format Indicating CHannel (PCFICH) and Physical HARQ Indicating CHannel (PHICH). Remaining OFDM symbols are used for transmitting user downlink data, e.g., a Physical Downlink Shared CHannel (PDSCH). Downlink physical channels are a set of Resource Elements (REs). An RE is a minimum unit of the time-frequency resources, i.e., a subcarrier in frequency domain and an OFDM symbol in time domain. The unit for physical resource allocation is a Physical Resource Block (PRB). One PRB includes 12 consecutive subcarriers in the frequency domain and corresponds to one slot in the time domain. Two PRBs on the same subcarriers of two slots within one subframe are referred to a PRB pair. The REs may be used for different purposes. Some REs do not correspond to the above mentioned physical channels but are merely used for transmitting downlink physical signals including a downlink reference signal and a synchronizing signal. According to different functions, the LTE downlink reference signal includes a cell-specific Common Reference Signal (CRS), a user-specific Demodulation Reference Signal (DMRS) and a Channel State Indication Reference Signal (CSI-RS).

In the LTE system, uplink data is transmitted based on a synchronous HARQ scheme. The initial transmission is triggered by the PDCCH carrying an UpLink (UL) grant. Retransmission may be triggered by the UL grant and the PHICH. In the LTE system, the semi-statically reserved PHICH time-frequency resources are indicated in a Physical Broadcast Channel (PBCH), i.e., 2 bits are used for indicating the number of PHICH groups. The RE resources of each PHICH group consist of 3 Resource Element Groups (REGs), which are distributed on the whole downlink bandwidth with equal intervals, so as to obtain a relatively large frequency diversity gain. Each REG is formed of 4 or 6 adjacent REs in one OFDM symbol. For a REG is formed of 6 adjacent REs, two REs are occupied by the CRS. Therefore, there are only 4 available REs. 8 PHICH resources may be multiplexed on each PHICH group through orthogonal extension. The PHICH resources allocated to one User Equipment (UE) are determined according to a minimum PRB index of the Physical Uplink Shared CHannel (PUSCH) and the uplink reference signal indication information ($n_{DMRS}$) in the UL grant. In particular, each PHICH resource is identified by an index pair ($n_{PHICH}^{group}$, $n_{PHICH}^{seq}$), wherein $n_{PHICH}^{group}$ denotes the index of the PHICH group, $n_{PHICH}^{seq}$ denotes the index of the orthogonal sequence in the PHICH group. Thus, the PHICH resources occupied by the UE can be defined according to following Equations (1) and (2)

$$n_{PHICH}^{group} = (I_{PRB\_RA}^{lowest\_index} + n_{DMRS}) \mod N_{PHICH}^{group} + I_{PHICH} N_{PHICH}^{group}$$

$$n_{PHICH}^{seq} = (\lfloor I_{PRB\_RA}^{lowest\_index}/N_{PHICH}^{group} \rfloor + n_{DMRS}) \mod 2N_{SF}^{PHICH}$$

(1) and (2)

Herein, $n_{DMRS}$ denotes the uplink reference signal indication information, $n_{SF}^{PHICH}$ denotes a spread factor of the PHICH, $I_{PRB\_RA}^{lowest\_index}$ denotes a minimum PRB index in slot 0 of the PUSCH, $N_{PHICH}^{group}$ denotes the number of PHICH groups semi-statically configured according to the following Equation (3):

$$I_{PHICH} = \begin{cases} 1 & \text{used for transmission of } PUSCH \text{ in subframes 4 and 9} \\ & \text{of } TDD \text{ uplink/downlink configuration 0} \\ 0 & \text{others} \end{cases} \quad (3)$$

In order to support a larger capacity of the control channel and support interference coordination of control channels of multiple cells, an enhanced PDCCH is proposed, referred to as ePDCCH hereinafter. The ePDCCH is mapped in the data area of the subframe for transmission and is multiplexed with the PDSCH in a Frequency Division Multiplex (FDM) manner. The base station may inform the UE of the PRB pair used for transmitting the ePDCCH through higher layer signaling. For different UEs, the PRB pair used for transmitting the ePDCCH may be different.

In order to configure the ePDCCH, a concept of an ePDCCH set is proposed. The base station may configure the UE to detect the ePDCCH on two ePDCCH sets. Each ePDCCH set is formed of $N_{PRB}$ PRB pairs, e.g., $N_{PRB}$=2, 4, or 8. According to the method for mapping the ePDCCH, the ePDCCH may include a local ePDCCH and a distributed ePDCCH. Each ePDCCH set is either used for bearing the distributed ePDCCH or used for bearing the local ePDCCH. Each distributed ePDCCH is generally mapped to all PRB pairs of one ePDCCH set, whereas the local ePDCCH is centrally mapped to one PRB pair of the ePDCCH set. If the aggregation levels of the local ePDCCH are relatively large, the local ePDCCH may also be mapped to multiple PRB pairs of the ePDCCH set.

In order to attain multiple ePDCCHs multiplexed on one PRB pair, except for the REs used for the DMRS, the REs in each PRB pair are divided into RE groups, referred to as enhanced REGs (eREGs). As shown in FIG. 4, each PRB pair is divided into 16 eREGs with indexes from 0 to 15. The indexes of the eREGs are mapped to all REs in the PRB pair except for the REs used for the DMRS firstly according to the frequency and then according to the time. In the case that normal CP is adopted, except for 24 RE resources used for the DMRS, a total of 144 RE resources are remained in the PRB pair. Therefore, each eREG includes 9 RE resources. A Control Channel Element (CCE) is obtained through combining multiple eREGs, denoted by enhanced CCE (eCCE). Through combining multiple eCCEs, the time-frequency resource occupied by one ePDCCH may be obtained. One eCCE is formed of $N_{eREG}$ eREGs. With respect to different frame structures, $N_{eREG}=4$ or 8. The 16 eREG indexes may be divided into 4 groups. eREG group 0 includes eREG indexes {0, 4, 8, 12}, eREG group 1 includes eREG indexes {1, 5, 9, 13}, eREG group 2 includes eREG indexes {2, 6, 10, 14}, eREG group 3 includes eREG indexes {3, 7, 11, 15}. Thus, if one eCCE is formed of 4 eREGs, the eCCE is formed by one group among the 4 eREG groups. If one eCCE is formed of 8 eREGs, the eCCE is formed by two pairs of eREG groups which are respectively eREG group (0, 2) and eREG group (1, 3). In other words, one eCCE includes eREG indexes {0, 2, 4, 6, 8, 10, 12, 14}, and another eCCE includes eREG indexes {1, 3, 5, 7, 9, 11, 13, 15}.

In evolved systems of the LTE system, the overhead of subsequent compatibility control signaling and the CRS is reduced, and interferences brought by the subsequent compatibility control signaling and the CRS are also reduced, which increases the spectrum utilization ratio of the UE. Since the CRS overhead is reduced, system power saving performance is improved. In such a system, the ePDCCH and the PDSCH are generally demodulated based on the DMRS. At present, it is referred to as a New Carrier Type (NCT).

In the NCT system, an enhanced PHICH (ePHICH) must be configured in a manner corresponding to the ePDCCH. Thus, when uplink data is transmitted in the NCT cell based on the synchronous HARQ, the ePHICH is used for acknowledgement of the correct reception of the uplink data or for triggering non-adaptive retransmission of the uplink data. For example, if the NCT cell works as a Secondary Cell (Scell) in a Carrier Aggregation (CA) system and the uplink transmission of the NCT cell is scheduled according to a self-scheduling policy, according to the existing design, the ePHICH resources must be allocated on the cell transmitting the UL grant, i.e., the current NCT cell. Therefore, there is a need for a way to transmit the ePHICH in the NCT system.

SUMMARY OF THE INVENTION

The present invention has been made to address at least the above problems and/or disadvantages and to provide at least the advantages described below. Accordingly, an aspect of the present invention provides a method and an apparatus for transmitting HARQ indication information for a new carrier type based on OFDM.

According to an aspect of the present invention, a method for transmitting Hybrid Automatic Repeat reQuest (HARQ) indication information is provided. The method includes transmitting, by a UE, uplink data on a Physical Uplink Shared CHannel (PUSCH) according to scheduling of a base station; detecting, by the UE, a new UpLink (UL) grant and enhanced Physical HARQ Indication CHannel (ePHICH) information of the base station for the uplink data according to a synchronous HARQ timing relationship, wherein ePHICH resources used for bearing the ePHICH information are mapped to a portion of time-frequency resources of a distributed enhanced Physical Downlink Control CHannel (ePDCCH) set; and if the UL grant is not detected, the UE retransmitting the uplink data or not transmitting the uplink data according to an indication of the ePHICH information.

According to another aspect of the present invention, a base station device is provided. The base station device includes an enhanced Physical HARQ Indication CHannel (ePHICH) generating module, adapted to perform operations including coding, rate matching and modulating to an ePHICH; and an ePHICH multiplexing module, adapted to map ePHICH resources bearing ePHICH information to a portion of time-frequency resources of a distributed ePDCCH set, and transmit the generated ePHICH information on the ePHICH resources.

According to another aspect of the present invention, a user device is provided. The user device includes an enhanced Physical HARQ Indication CHannel (ePHICH) de-multiplexing module, adapted to de-multiplex ePHICH resources used for bearing ePHICH information, in order to obtain the ePHICH information, wherein the ePHICH resources are mapped to a portion of time-frequency resources of a distributed ePDCCH set; and an ePHICH detecting module, adapted to demodulate and decode the ePHICH information.

BRIEF DESCRIPTION OF THE DRAWINGS

The above and other aspects, features, and advantages of the present invention will be more apparent from the following detailed description when taken in conjunction with the accompanying drawings, in which:

FIG. 4 is a diagram illustrating division of eREGs;

DETAILED DESCRIPTION OF EMBODIMENTS OF THE PRESENT INVENTION

Figure 1:
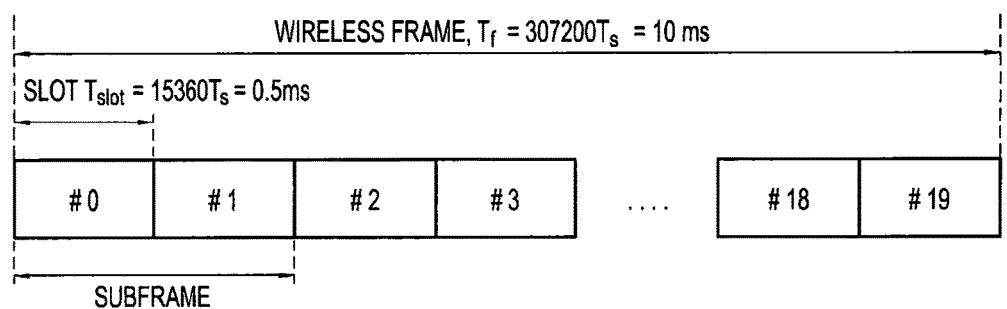
FIG. 1 is a diagram illustrating a frame structure of a FDD system.
Figure 2:
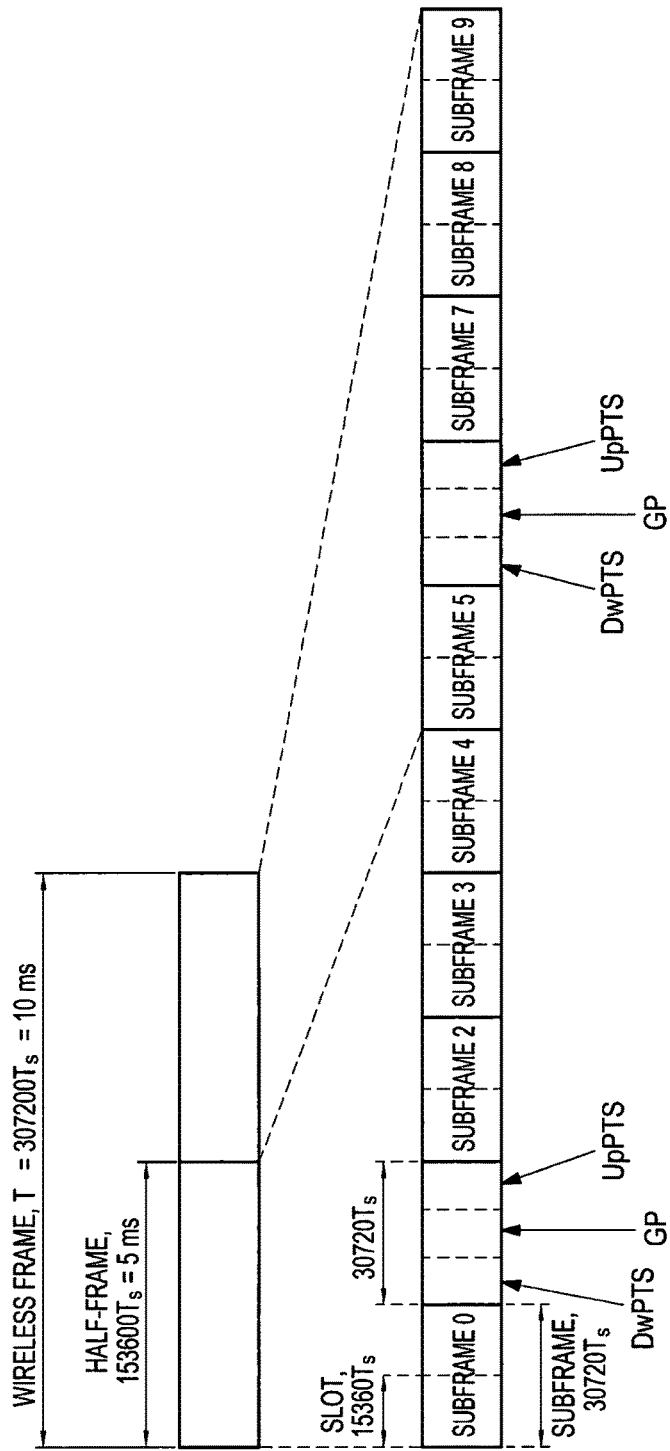
FIG. 2 is a diagram illustrating a frame structure of a TDD system.
Figure 3:
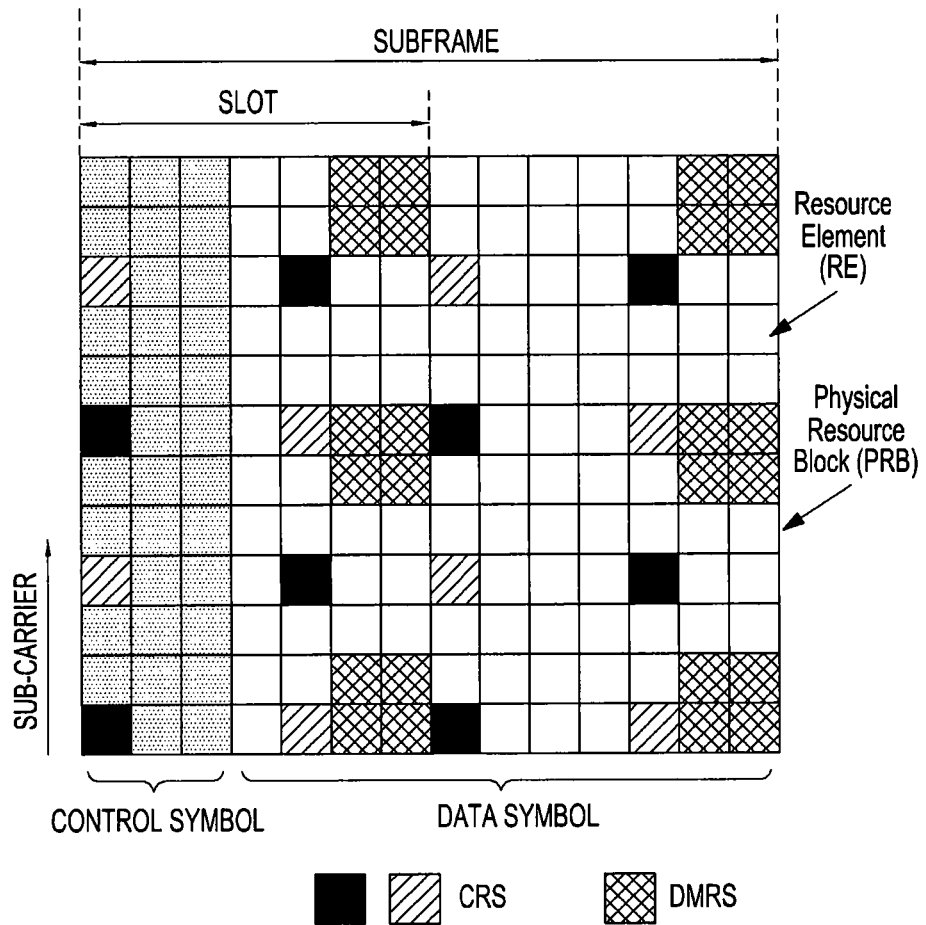
FIG. 3 is a diagram illustrating a structure of a subframe.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 5:
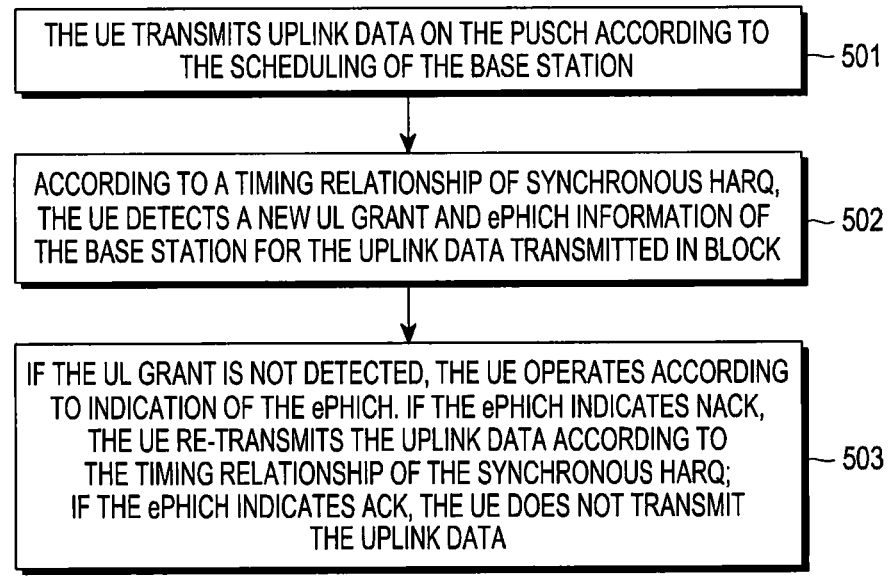
FIG. 5 is a flowchart illustrating a method for transmitting HARQ indication information according to an embodiment of the present invention.

FIG. 5 is a flowchart illustrating a method for transmitting HARQ indication information according to an embodiment of the present invention.

For a cell that demodulates downlink control channel and PDSCH based on DMRS, FIG. 5 shows a synchronous HARQ transmission procedure for the PUSCH according to an embodiment of the present invention.

Referring to FIG. 5, at step 501, the UE transmits uplink data on the PUSCH according to the scheduling of the base station.

The uplink data may be dynamically scheduled according to UL grant, or may be a re-transmission of previous uplink data triggered by the ePHICH, or may be transmitted on uplink channel resources allocated based on Semi-Persistent Scheduling (SPS).

At step 502, according to a timing relationship of synchronous HARQ, the UE detects a new UL grant and ePHICH information of the base station for the uplink data transmitted at step 501.

Herein, the ePHICH resources used for bearing the ePHICH information are mapped to at least some time-frequency resources of one distributed ePDCCH set.

At step 503, if the UL grant is not detected, the UE operates according to an indication of the ePHICH. If the ePHICH indicates Negative ACKnowledgment (NACK), the UE re-transmits the uplink data according to the timing relationship of the synchronous HARQ; if the ePHICH indicates ACKnowledgment (ACK), the UE does not transmit the uplink data.

After step 503, the synchronous HARQ transmission procedure of the PUSCH ends.

In step 502 of the above-described transmission procedure, for a cell that demodulates the downlink control channel and the PDSCH based on the DMRS, e.g., the above described NCT cell, since there is no CRS, the method for allocating PHICH resources defined in existing LTE systems is not applicable, i.e., the ePHICH must be transmitted based on the demodulation of the DMRS. Therefore, according to an embodiment of the present invention, the ePHICH is also mapped to the data area of the subframe to be transmitted and is transmitted in a frequency division multiplex manner with the PDSCH, which is the same manner as with the ePDCCH. In order to reduce inter-cell ePHICH interferences, increase the capacity of the PHICH and ensure the frequency diversity gain, the set of multiple PRB pairs on which the ePHICH resources are mapped is designed in a same manner as that of the existing distributed ePDCCH set. In particular, the DMRS on each PRB pair of the ePDCCH set used for the ePHICH are shared. For example, the DMRS of two ports are transmitted on each PRB pair, and all ePHICH resources multiplexed on the ePDCCH set use the DMRS of these two ports. In the following description of embodiments of the present invention, the set of multiple PRB pairs on which the ePHICH is mapped is still referred to as a distributed ePDCCH set. In fact, the distributed ePDCCH and the ePHICH may be multiplexed on the distributed ePDCCH set at the same time. As described above, the ePHICH is mapped on the distributed ePDCCH set for transmission. Such a distributed ePDCCH set may be dedicated for ePHICH transmission, or may be multiplexed by the ePDCCH and the ePHICH.

Figure 6:
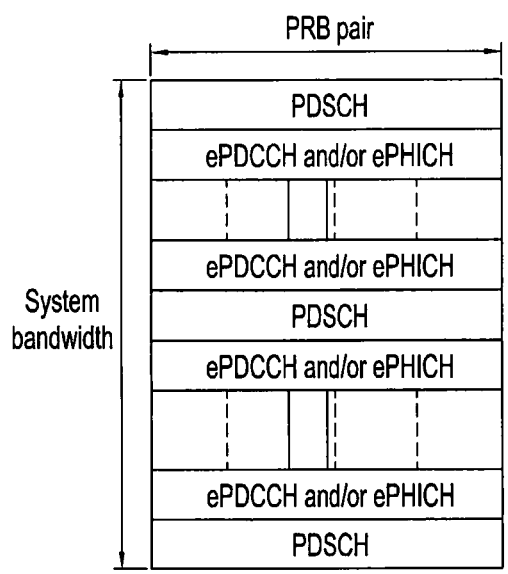
FIG. 6 is a diagram illustrating multiplexing of ePDCCH and ePHICH according to an embodiment of the present invention.

For example, as shown in FIG. 6, each ePHICH resource is mapped to multiple PRB pairs of the distributed ePDCCH set, so as to obtain the frequency diversity gain. The time-frequency resources of each PRB pair of the ePDCCH set may be multiplexed by the ePHICH and the ePDCCH. In the following description, users in systems after 3GPP LTE Release-12 are referred to Rel-12 UE, whereas users in systems of former Release-11 are referred to as Rel-11 UE.

As step 502 of the method of FIG. 5, the ePHICH resources are mapped to at least some time-frequency resources of the distributed ePDCCH set, i.e., ePHICH resources must be configured on the time-frequency resources of the distributed ePDCCH set. Hereinafter, the configuration of the time-frequency resources of the distributed ePDCCH set occupied by the ePHICH resources are described with reference to three examples.

EXAMPLE 1

On one PRB pair of the distributed ePDCCH set, each ePHICH resource may occupy one or more REGs, taking one REG as a unit. At the same time, in order to obtain the frequency diversity gain, each ePHICH resource may be mapped to multiple PRB pairs of the ePDCCH. For example, the PHICH is mapped to 3 REGs in conventional systems. Similarly, each ePHICH resource may be mapped to the REGs of three PRB pairs. Alternatively, for the ePDCCH set including 4 PRB pairs, each ePHICH resource may be mapped to the 4 PRB pairs, e.g., occupy one REG on each PRB pair. For the ePDCCH set including 8 PRB pairs, the 8 PRB pairs may be divided into two groups, such that group includes 4 PRB pairs. The ePHICH resources are mapped respectively on the 4 PRB pairs of each group. For the ePDCCH set including 2 PRB pairs, each ePHICH resource is mapped to the 2 PRB pairs and occupies at least one REG on each PRB pair.

Generally, some OFDM symbols in one subframe are used for special purposes. For example, some OFDM symbols in the subframe are used for bearing DMRS to demodulate downlink data transmission. For example, according to the design of the existing LTE systems, for a normal subframe, the DMRS is transmitted on the last two OFDM symbols of each slot. For the DwPTS of the TDD system, the DMRS is configured on OFDM symbols different from those in the normal subframe. In addition, there are also some OFDM symbols in the subframe that may be configured to transmit CSI-RS. For example, according to the design of the LTE FDD system, for a normal subframe, last two OFDM symbols of slot 0 and OFDM symbols 2, 3, 5, and 6 in slot 1 can be used for transmitting the CSI-RS. In addition, in order to ensure the accurate time and frequency synchronization, a Tracking Reference Signal (TRS) used for synchronous tracking of time and frequency must be transmitted. For example, the TRS may reuse the time-frequency mapping structure of existing CRS port 0, i.e., for a normal subframe, the TRS occupies OFDM symbols 0 and 4 of each slot.

Based on the requirement that some OFDM symbols in the subframe are to be used for special purposes, according to an embodiment of the present invention, when allocating REG resources occupied by the ePHICH, OFDM symbols in the subframe except for those used for or may be used for the DMRS and the CSI-RS are used for bearing the ePHICH. According to this method, the definition of the REG in the existing systems may be reused completely, so as to ensure that available REs in one REG have a small subcarrier interval. In fact, the CSI-RS may be respectively configured for each UE, i.e., the number of the REs except for the REs used for the CSI-RS on the OFDM symbol used for the CSI-RS varies with the configurations of the UE. However, the ePHICH set must be shared by multiple UEs or determined in a cell-specific manner, which makes it inappropriate to multiplex the ePHICH on the OFDM symbols used for the CSI-RS using the REG dividing method. When the affection of the CSI-RS is processed, it is possible to ensure, for a system of any duplex mode (FDD or TDD), that all OFDM symbols may be used for CSI-RS are not used for transmission of the ePHICH. Alternatively, for the FDD and TDD systems, it is possible to ensure that the OFDM symbols that may be used for bearing the CSI-RS in both of the two systems are not used for transmission of the ePHICH. Alternatively, when allocating the REG resources occupied by the ePHICH, it may be possible to avoid use of the OFDM symbols containing the TRS, such that each REG maps to four REs which are consecutive in frequency.

As described above, the definition of the REG may be the same as the definition used in LTE Release-8. When one OFDM symbol is not used for transmission of the TRS, each REG is formed of four consecutive REs, such that a total of three REGs are configured in the OFDM symbol of the PRB pair. When one OFDM symbol is used for transmission of the TRS, and the TRS reuses the time-frequency pattern of an existing CRS port 0, the method of LTE Release-8 is adopted at this time. For example, suppose that all of the REs corresponding to the CRS port 0 and port 1 are not used for transmitting the ePHICH. Thus, each REG is formed of 6 consecutive REs. But only four of them can be used for transmitting the ePHICH. Finally, only 2 REGs can be configured on the OFDM symbol of the PRB pair. If the TRS occupies only the REs corresponding to the CRS port 0, although the REs corresponding to the CRS port 1 cannot be used for transmitting the ePHICH, those REs can be used for transmitting the ePDCCH.

Figure 7:
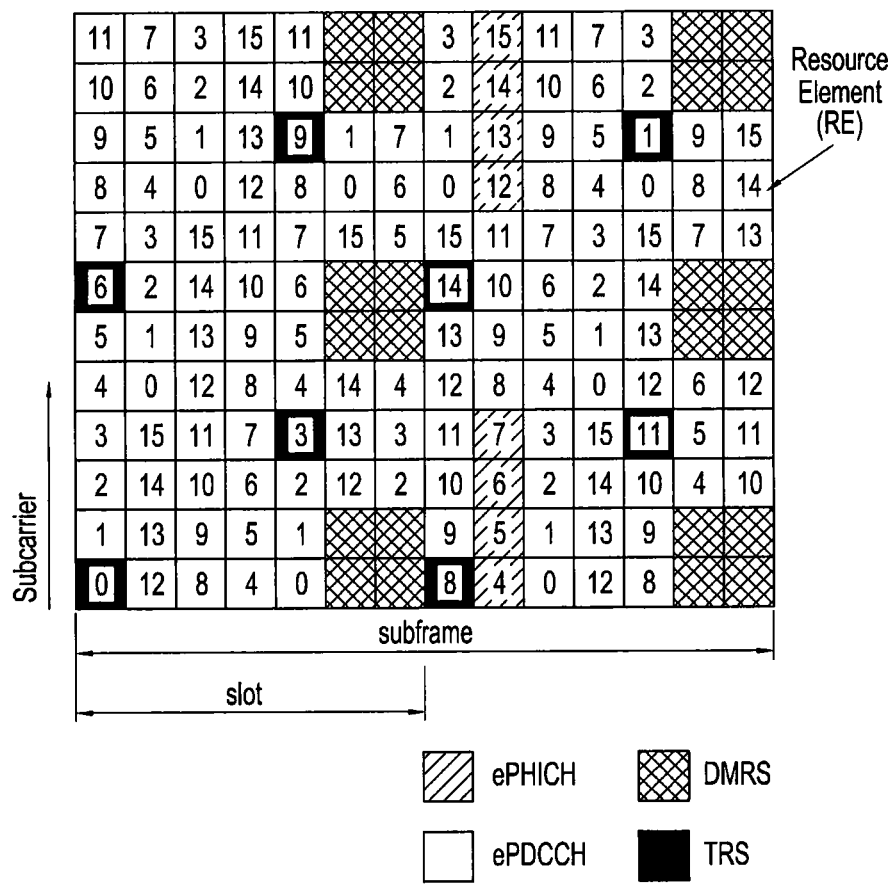
FIG. 7 is a diagram illustrating a first configuration of ePHICH time-frequency resources according to an embodiment of the present invention.

FIG. 7 is a diagram illustrating a first configuration of ePHICH time-frequency resources according to an embodiment of the present invention.

FIG. 7 shows a structure of an ePHICH of a frame structure with a normal CP according to an embodiment of the present invention. Suppose that the DMRS time-frequency structure and the CSI-RS time-frequency structure in the existing LTE Release are used. And suppose that the TRS uses the time-frequency structure of the existing CRS port 0, and the OFDM symbols which can be used for bearing the DMRS and the CSI-RS are not used for transmitting the ePHICH. Thus, within one PRB pair, in order to avoid conflicts with the OFDM symbols used for the DMRS and the CSI-RS, only the OFDM symbols 0, 1, 2, 3, and 4 of slot 0 and the OFDM symbols 0, 1, and 4 of slot 1 can be used for bearing the transmission of the ePHICH. In FIG. 7, suppose that two traditionally defined REGs on OFDM symbol 1 of slot 1 are occupied for transmitting the ePHICH, whereas other REs of OFDM symbol 1 of slot 1 can be used for bearing the ePDCCH.

As described above, in this example, the time-frequency resources occupied by the ePHICH may be located on some designated OFDM symbols. In particular, in a system (TDD system or FDD system), when the ePHICH resources of the whole system are allocated, the OFDM symbols occupied by these ePHICH resources may be determined in two ways described as follows.

One way for determining the OFDM symbols occupied by these ePHICH resources includes calculating, according to the total amount of ePHICH resources to be reserved in the system, the number of OFDM symbols to be occupied. It is ensured that only some REGs of at most one OFDM symbol are not reserved to the ePHICH. Then, the OFDM symbols used for transmitting the ePHICH are allocated according to the determined number of OFDM symbols.

The OFDM symbols used for transmitting the ePHICH may be allocated according to a time sequence of the OFDM symbols, i.e., the allocation sequence is: OFDM symbols 0, 1, 2, 3, and 4 of slot 0, then OFDM symbols 0, 1, and 4 of slot 1.

However, the channel estimation precisions of different OFDM symbols are different. For example, the OFDM symbols of slot 1 in FIG. 7 are located between DMRSs and thus have a better channel estimation performance. However, the OFDM symbols in slot 0 are located outside the DMRS and need additional extrapolation to obtain the channel estimation, and therefore, the channel estimation precision is low. If the OFDM symbols occupied by the ePHICH resources are allocated according to the time sequence of the OFDM symbols, the ePHICH will be transmitted on the OFDM symbols with low channel estimation precisions. In order to improve the performance of the ePHICH, it is possible to allocate OFDM symbols with better channel estimation performances to the ePHICH. For example, the OFDM symbols used for transmitting the ePHICH may be allocated according to a reverse order of the time sequence of the OFDM symbols, i.e., according to the number of the required OFDM symbols, the allocation order is: OFDM symbols 4, 1, 0 of slot 1, and then OFDM symbols 4, 3, 2, 1, 0 of slot 0.

In another method for allocating the OFDM symbols occupied by ePHICH resources in a whole system, a set of OFDM symbols that can be used for transmitting the ePHICH is determined first. The number of time-frequency resources in this set may be far greater than the number of time-frequency resources that must be reserved for the ePHICH in the system. Then, the ePHICH resources are allocated on the OFDM symbols of the set. The set of OFDM symbols that can be used for transmitting the ePHICH may be defined in advance, e.g., all of the OFDM symbols can be used for transmitting the ePHICH in FIG. 7, or a subset of all of the OFDM symbols that can be used for transmitting the ePHICH in FIG. 7. The set of the OFDM symbols that can be used for transmitting the ePHICH may also be configured by higher layer signaling.

After the OFDM symbols used for transmitting the ePHICH are determined, each ePHICH resource must be mapped to a detailed REG in the allocated OFDM symbols. In order to obtain a frequency diversity gain, each ePHICH resource may be mapped to multiple PRB pairs of the ePDCCH. As to which REGs on the PRB pair are occupied by the ePHICH resource, there are two cases.

For example, one ePHICH resource may occupy REGs on the same time-frequency location of multiple PRB pairs. On each PRB pair, the same method is adopted to index the REGs in the OFDM symbols reserved for transmitting the ePHICH, i.e., the ePHICH resource uses the REGs with the same indexes on each PRB pair. Multiple PHICH resources capable of being multiplexed on one REG are referred to as an ePHICH group. According to this method, when the time-frequency resource of the ePHICH is allocated on the OFDM symbol used for the TRS, the four available REs of one REG are not equally distributed in the 4 eCCEs, i.e., at least one RE of each eCCE is not occupied. However, considering that there are generally multiple REGs in one PRB pair are used for the ePHICH, these REGs have different impacts to the eCCE, and the impact to the number of available REs of the eCCE is averaged.

According to another example, the ePHICH resources occupy REGs of different time-frequency locations on different PRB pairs. The advantage is that the channel estimation performances of the REGs of the ePHICH resources are averaged. In addition, through controlling the REGs occupied by one ePHICH resource on different PRB pairs, it can be ensured that the number of REs occupied by each ePHICH on each eCCE is the same. On each PRB pair, the same method may be used for indexing the REGs in the OFDM symbols reserved for transmitting the ePHICH. Thus, REGs with different indexes on the PRB pairs are used by the ePHICH resource. For example, denote that the indexes of the REGs in the set of OFDM symbols used for ePHICH on one PRB pair are $0, 1, \ldots N_{REG}^{PRBP}-1$, wherein $N_{REG}^{PRBP}$ denotes the total number of REGs can be used for transmitting the ePHICH. Thus, the index of the REG occupied by the $p^{th}$ ePHICH resource on the $m^{th}$ PRB pair of the ePDCCH set is defined according to the following Equation (4):

$$\left(m \cdot \left\lfloor \frac{N_{REG}^{PRBP}}{N_{PRBP}} \right\rfloor + p\right) \bmod N_{REG}^{PRBP}, \quad (4)$$

$$m = 0, 1, \ldots N_{PRBP}-1, \, p = 0, 1, \ldots N_{REG}^{PRBP}-1$$

Where $N_{NPRBP}$ denotes the number of PRB pairs occupied by the ePHICH resource. On the OFDM symbol set used for the ePHICH, the number of REGs reserved for the ePHICH on each PRB pair can be obtained through higher layer signaling. For example, denoting the number by $N_{REG}^{configured}$, thus on the first PRB pair, the REGs with indexes $0, 1, \ldots, N_{REG}^{configured}-1$ may be reserved for transmitting the ePHICH, whereas other REGs can still be used for transmitting the ePDCCH. For other PRB pairs, a determination of which REGs are reserved for the ePHICH according to a REG mapping relationship of the ePHICH resource, whereas other REGs can still be used for transmitting the ePDCCH. Embodiments of the present invention do not place restrictions on the method for determining the indexes of the REGs on each PRB of one PHICH. Multiple PHICH resources multiplexed on one REG are referred to as an ePHICH group.

Figure 8:
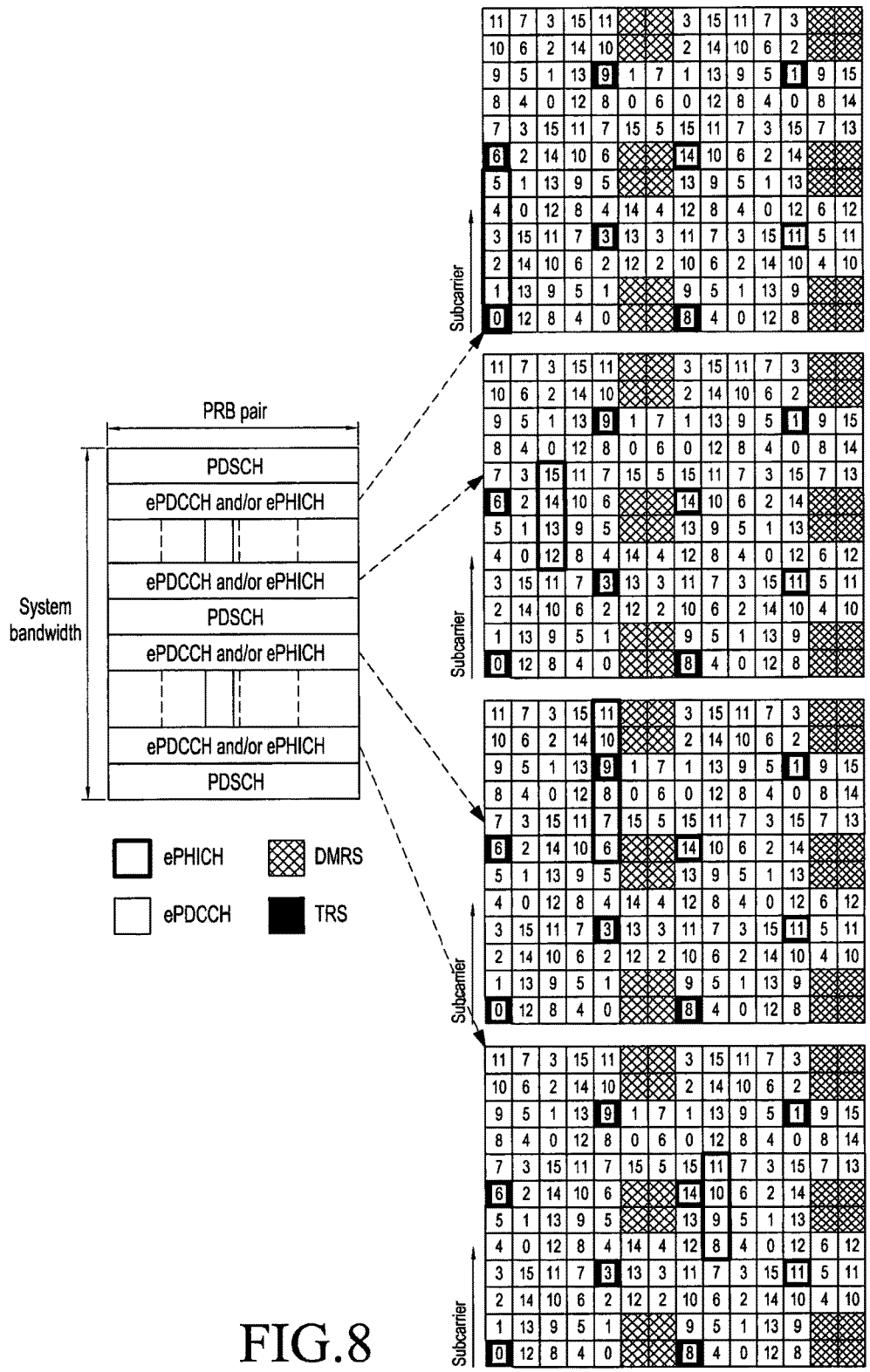
FIG. 8 is a diagram illustrating a second configuration of ePHICH time-frequency resources according to an embodiment of the present invention.

FIG. 8 is a diagram illustrating a second configuration of ePHICH time-frequency resources according to an embodiment of the present invention.

For example, as shown in FIG. 8, suppose that one ePHICH resource must be mapped to four REGs that respectively include: one REG of OFDM symbol 0 of slot 0 of the first PRB pair, one REG of OFDM symbol 3 of slot 0 of the second PRB pair, one REG of OFDM symbol 5 of slot 0 of the third PRB pair, and one REG of OFDM symbol 1 of slot 1 of the fourth PRB pair.

When the ePHICH resources are mapped according to the above method, the UE must know the number of REs used for transmitting the ePHICH in one distributed ePDCCH set, so as to detect the ePHICH on the right RE set. This can be solved by semi-statically configuring the number of time-frequency resources occupied by the ePHICH. For example, similar to the transmission of the ePHICH in the existing system, the system may semi-statically configure the number of ePHICH groups on the ePDCCH set, so as to the number of REs occupied by the ePHICH.

For a cell that demodulates all downlink control channels and the PDSCH based on the DMRS, if receipt of the PDCCH of a Rel-11 UE must be supported, since the Rel-11 UE cannot recognize the time-frequency resources occupied by the ePHICH, the above-described method in which the OFDM symbols for the ePHICH are allocated according to the time sequence of the OFDM symbols may reduce the impact of the ePHICH to the ePDCCH of the Rel-11 UE.

In particular, for the Rel-11 UE, for one ePDCCH set, higher layer signaling may be used to perform a configuration such that the ePDCCH is transmitted from the $n^{th}$ OFDM symbol in the subframe. Thus, the Rel-11 UE will not detect signals on OFDM symbols before the nth OFDM symbol in the subframe. Thus, the number N of OFDM symbols that must be reserved may be calculated according to the number of ePHICH resources. Then, the Rel-11 UE is configured by higher layer signaling to transmit the ePDCCH from the nth OFDM symbol, n≥N. According to this method, since the Rel-11 UE does not transmit the ePDCCH on OFDM symbols before the $n^{th}$ OFDM symbol, it is not affected by the ePHICH multiplexed on the OFDM symbols before the nth OFDM symbol. The Rel-12 UE detects the ePHICH in the previous n OFDM symbols. Besides the OFDM symbols that begin from the nth OFDM symbol, it may use REs not used for ePHICH in the OFDM symbols before the nth OFDM symbol for transmitting the ePDCCH.

Figure 9:
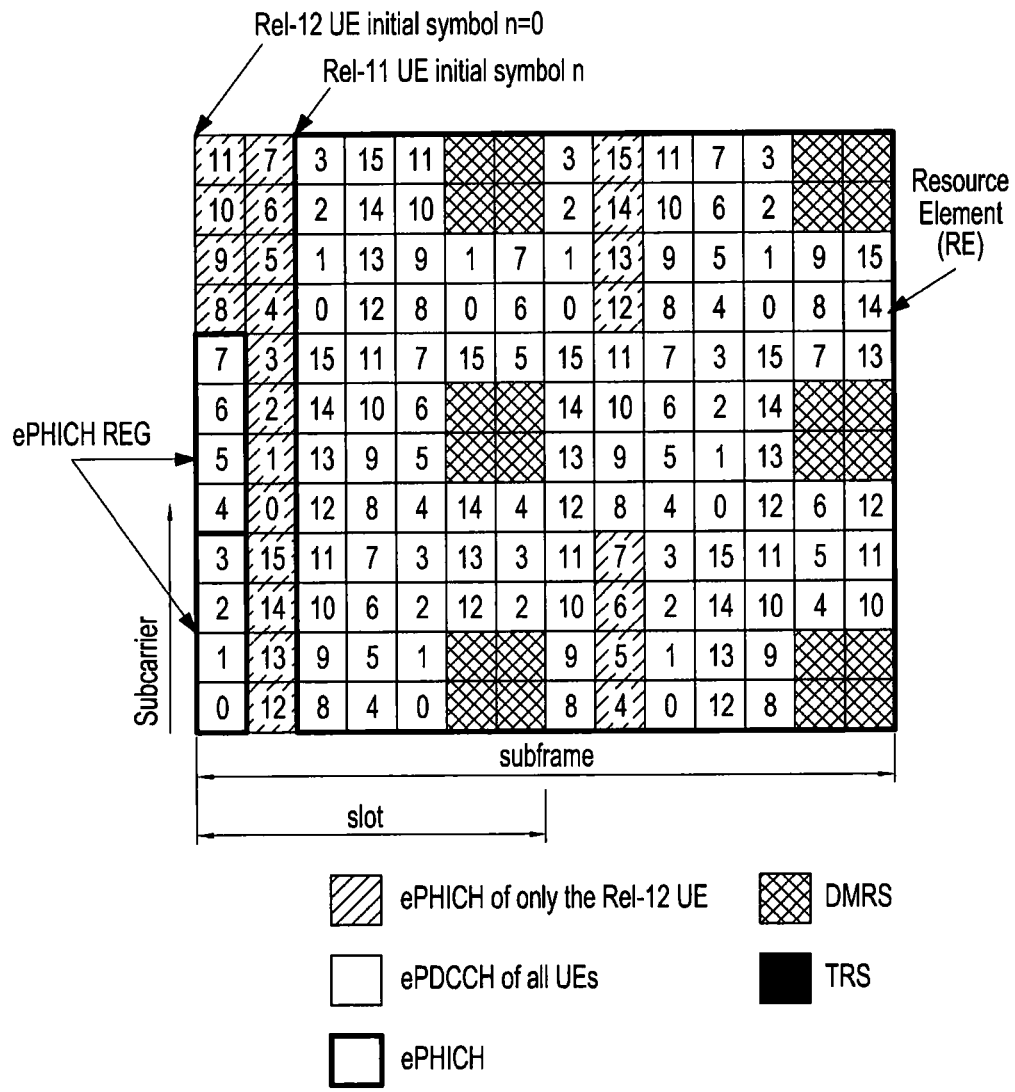
FIG. 9 is a diagram illustrating a third configuration of ePHICH time-frequency resources according to an embodiment of the present invention.

FIG. 9 is a schematic diagram illustrating a third configuration of ePHICH time-frequency resources according to an example embodiment of the present invention FIG. 9 shows the above method according to an embodiment of the present invention. Suppose that the time-frequency structure of the DMRS and the time-frequency structure of the CSI-RS in the existing LTE system are used. For the Rel-11 UE, the ePDCCH is configured to be mapped to an area from the nth OFDM symbol in the PRB pair through higher layer signaling, wherein n=2, i.e., the area surrounded with black thick lines. The ePDCCH of the Rel-12 UE may be mapped to all OFDM symbols in the subframe. The ePHICH of the Rel-12 UE is mapped to the area of former n=2 OFDM symbols in the PRB pair. As shown in FIG. 9, two REGs in OFDM symbol 0 in slot 0 are used for transmitting the ePHICH, other REs in the former 2 OFDM symbols of slot 0 may be used for transmitting the ePDCCH of the Rel-12 UE, but the Rel-11 UE can only use RE resources from the second OFDM symbol.

EXAMPLE 2

In this example, when the ePHICH resource is allocated for the UE, the ePHICH may occupy time-frequency resources of one or more eCCEs in one distributed ePDCCH set. Thus, the transmission of the ePHICH does not impact the link performance of other eCCEs used for the ePDCCH in the ePDCCH set. Since the number of eCCEs configured in the ePDCCH set does not change, the number of eCCEs available for transmitting the ePDCCH is reduced.

At this time, the eCCE used for the ePHICH in the ePDCCH set may be semi-statically configured, i.e., these eCCEs are only used for the ePHICH but not for the ePDCCH. Or, the eCCEs allocated for the ePHICH in the ePDCCH set may change dynamically, i.e., when a User Specific Space (USS) of the ePDCCH is defined, the eCCEs in the USS may overlap with the eCCEs of the ePHICH. Thus, if one eCCE does not currently bear any ePHICH, the base station scheduler may use this eCCE for transmitting the ePDCCH of the UE dynamically, so as to increase resource utilization ratio.

Figure 10:
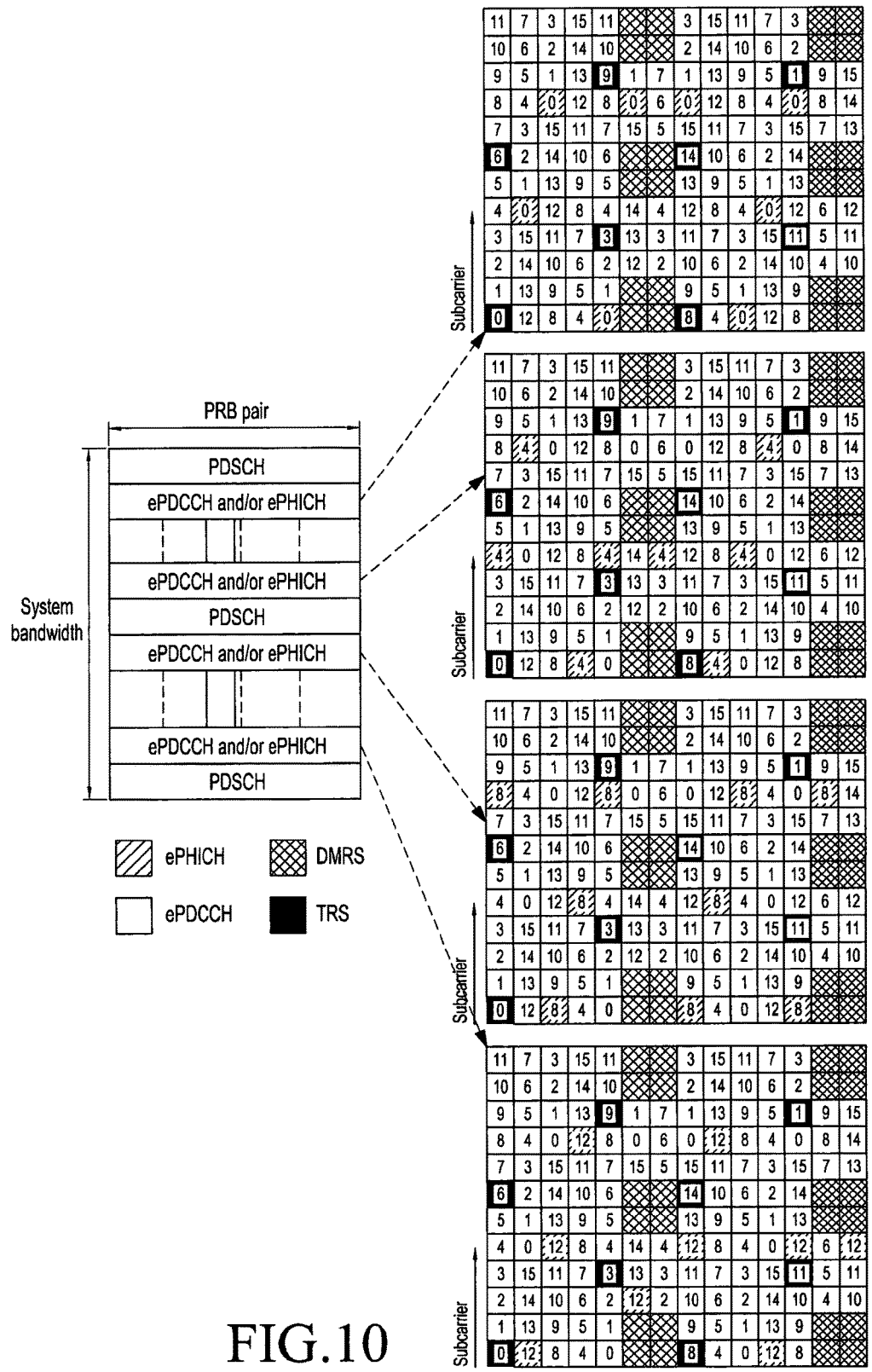
FIG. 10 is a diagram illustrating a fourth configuration of ePHICH time-frequency resources according to an embodiment of the present invention.

FIG. 10 is a schematic diagram illustrating a fourth configuration of ePHICH time-frequency resources according to an example embodiment of the present invention.

FIG. 10 shows an ePHICH of a frame structure with a normal CP according to an embodiment of the present invention. Suppose that the time-frequency structure of the DMRS and the time-frequency structure of the CSI-RS in the existing LTE system are used. Also suppose that the TRS uses the time-frequency structure of the CRS port 0. In order to obtain the frequency diversity gain, the ePHICH is transmitted in a distributed manner, i.e., the ePHICH is mapped to one or more eCCEs in the distributed ePDCCH set, whereas other eCCE resources in the ePDCCH set are used for transmitting the ePDCCH.

In FIG. 10, suppose that the distributed ePDCCH set includes four PRB pairs based on the distributed transmission and suppose that the ePHICH resource is mapped to the eCCE with index 0 which occupies eREGs with indexes 0, 4, 8, and 12 on each PRB pair of the ePDCCH set. Remaining eCCE resources are used for transmitting the ePDCCH. Since the REs occupied by the eREGs are distributed averagely in the PRB pair, the affection of the channel estimation based on the DMRS to the ePHICH transmission within one PRB pair is balanced. At the same time, since the four eREGs used for ePHICH are distributed on four PRB pairs of the ePDCCH set, the frequency diversity gain is obtained, which further improves the system performance of the ePHICH.

In a method according to an embodiment of the present invention, the system configures the time-frequency resource for the PHICH taking one eCCE as a unit. The system may allocate one or more eCCEs of the ePDCCH set to the ePHICH. Accordingly, a method for multiplexing the ePHICH resources one eCCE may be defined. The method may be used repeatedly on multiple eCCEs that are used for the ePHICH. Hereinafter, a method for multiplexing ePHICH information bits on one eCCE is described in further detail. Two methods for multiplexing N ePHICH information bits on one eCCE are described as follows.

In one method for multiplexing the N ePHICH information bits according to an embodiment of the present invention, a joint coding, e.g., convolution coding or RM coding, is performed to the N ePHICH information bits. Then, rate matching is performed, such that the number of bits after the rate mapping equals to the number of physical bits of all REs of one eCCE. Then, Quadrature Phase Shift Keying (QPSK) modulation is performed and the information bits are mapped to each RE of the eCCE for transmission.

In fact, the number of REs of the eCCE is relatively large, e.g., 36. Accordingly, it may bear a relatively large number N of information bits of the ePHICH. There may be some problems if the joint coding is directly performed to the N information bits. For example, transmission powers of the N bits are the same. Power control cannot be performed with respect to the link status of the UE corresponding to each bit. The UE must perform an associated decoding to the N bits to obtain one ePHICH information bit, which increases the operation complexity.

Based on the above consideration, a second ePHICH multiplexing method provided according to an embodiment of the present invention is as follows. The RE resources of one eCCE are divided into several sub-groups, and an association coding is performed on the resources of each sub-group according to the above first method to transmit the ePHICH information bit corresponding to this sub-group. Hereinafter, two sub-group dividing methods are described.

In one sub-group dividing method, the sub-groups are divided taking the RE as a unit. The division of the sub-groups may be performed within the PRB pair. For example, one eREG in one PRB pair may have 9 REs. Then, these REs may be divided into two sub-groups, one sub-group includes 4 REs and the other includes 5 REs. Alternatively, these REs may be divided into 3 sub-groups, each of which respectively includes 3 REs. Herein, when the sub-groups are divided, scattering the REs in one sub-group to multiple OFDM symbols and multiple subcarriers of the PRB pair, results in improved balancing of the impact of the channel estimation. For example, the REs of the eREGs that the eCCE occupied on one PRB pair are indexed successively as $r_k$, $k=0, 1, \ldots, N_{eREG}^{RE}-1$, wherein $N_{eREG}^{RE}$ denotes the total number of REs of the eREG, the REs are divided into G sub-groups, then the index of the RE corresponding to the $g^{th}$ sub-group is defined according to the following Equation (5):

$$r_{mG+g}, g = 0, 1, \ldots, G-1, m = 0, 1, \ldots, \frac{N_{eREG}^{RE}}{G} - 1. \quad (5)$$

Alternatively, the division of the sub-groups may be performed on multiple PRB pairs occupied by the eCCE. For example, the eCCE includes 36 REs which may be divided into two sub-groups, each of the sub-groups including 18 REs. Herein, when the sub-groups are divided, ensuring that the REs of each sub-group are averagely distributed on different PRB pairs occupied by the eCCE, ensures the frequency diversity feature. For example, the REs occupied by the eCCE may be indexed successively. It is possible to index the REs occupied by the eCCE on one PRB pair successively, and then index the REs occupied by the eCCE on a next PRB pair successively. Denote the indexes of the REs occupied by the eCCE by $c_k$, $k=0, 1, \ldots, N_{eCCE}^{RE}-1$, wherein $N_{eCCE}^{RE}$ denotes the total number of the REs of the eCCE, and G sub-groups must be divided, then the index of the RE corresponding to the $g^{th}$ sub-group is defined as the following Equation (6):

$$c_{mG+g}, g = 0, 1, \ldots, G-1, m = 0, 1, \ldots, \frac{N_{eCCE}^{RE}}{G} - 1. \quad (6)$$

When the numbers of REs are different in sub-groups, the number of ePHICH bits borne by each subframe may be determined according to a proportion of the numbers of REs of the sub-groups. Alternatively, the operation may be simplified to fixedly bear fixed number of ePHICH bits on each sub-group. Suppose that M ePHICH information bits must be multiplexed on one sub-group. The joint coding is firstly performed to the M ePHICH information bits. Then, rate matching is performed to make the number of bits after the rate matching equal to the number of physical bits of all REs of the sub-group. Then, QPSK modulation is performed and the information bits are mapped to the REs of the sub-group for transmission.

Alternatively, since the QPSK modulation is adopted, in the second sub-group dividing method, the I-branch and the Q-branch of the modulated symbol of each RE of the eCCE may be separated, i.e., the I-branches of all RE resources of one eCCE are divided into one sub-group, and all Q-branches are divided into another sub-group. As such, the ePHICH is transmitted independently on the two sub-groups I and Q. Suppose that M ePHICH information bits must be multiplexed on one I-branch or Q-branch of the eCCE, M approximately equals to half of N. Then, the joint coding may be first performed to the M ePHICH information bits. Then, rate matching is performed to make the number of bits after the rate matching equal to the number of physical bits of all REs of one I-branch or Q-branch of the eCCE. Then, QPSK modulation is performed and the information bits are mapped to each RE of one I-branch or Q-branch of the eCCE for transmission.

In fact, according to the CP length of the system, the subframe is a normal subframe or a DwPTS of the TDD system. It is used for bearing an initial OFDM symbol index of the ePDCCH/ePHICH. The number of available REs of each eREG of each PRB pair of the ePDCCH set is variable. In addition, some REs are used for TRS or CSI-RS, which further aggravates the variation of the number of REs of the eREG. The variation of the number of REs of the eREG results in the variation of the number of REs of the eCCE. The variation of the number of REs of the eCCE results in the variation of capability for bearing ePHICH information bits. Hereinafter, one method is described to dealing with the impact of the variation of the number of REs of the eCCE.

For each subframe or each group of subframes, when the number of PHICH information bits can be borne by one eCCE is determined, the number of PHICH information bits to be transmitted may be determined according to the number of available REs of the eCCE or the sub-group of the eCCE.

Alternatively, in order to simplify the system and the UE's operation, the coding and multiplexing method of the ePHICH may be designed to transmit fixed number of PHICH information bits on the eCCE or the sub-group of the eCCE, suppose that the fixed number of bits is X. For example, the number X of ePHICH bits can be transmitted on one eCCE may be determined according to the maximum number of REs among eCCEs of all subframes. In the case that the number of available REs of the eCCE of the sub-group is relatively small, both the base station and the UE know that the eCCE of the current subframe has a relatively small number of available REs. Therefore, at the base station side, the base station scheduler ensures that ePHICH information is transmitted on Y bits of the X bits, wherein Y is smaller than or equal to X. Y is determined according to the number of available REs of the eCCE of the current subframe. Suppose that the Y bits are former Y bits in the X bits. Accordingly, at the UE side, the UE also knows that the base station uses the Y bits among the X bits to transmit the ePHICH information. Thus, during the decoding of the ePHICH, according to the prior information, the decoding complexity is decreased and the decoding performance to the Y bits is improved. For example, the joint coding may be the RM code. The base station may fixedly configure unused bits among the X bits to 0. The UE also fixedly takes the unused bits among the X bits as 0 to simplify the operation.

Similar to the PHICH transmission in the existing systems, for the resource mapping of the ePHICH, multiple ePHICH groups may be defined, each of which includes multiple ePHICH resources. Each ePHICH resource is identified by an index pair ($n_{ePHICH}^{group}$, $n_{ePHICH}^{seq}$), wherein $n_{ePHICH}^{group}$ is the index of the ePHICH group, $n_{ePHICH}^{seq}$ is the index of the ePHICH resource in the ePHICH group. Herein, each ePHICH actually corresponds to one bit of the joint coding.

In the above-described example according to an embodiment of the present invention, multiple ePHICH information bits are multiplexed on one eCCE using joint coding. The joint coding may be performed on all REs of the eCCE directly. Or, sub-groups may be divided firstly and then the joint coding is performed on the REs of the sub-groups.

Whichever of the above two multiplexing methods is adopted, the following method may be adopted to group and map the ePHICH resources. In particular, the ePHICH bits multiplexed on one eCCE may be indexed and are further divided into ePHICH groups. Suppose that the number of ePHICH bits can be transmitted on the eCCE is N and each ePHICH group includes Ng ePHICH bits, then the PHICH bits on the eCCE are divided into $\lceil N/Ng \rceil$ groups, wherein $\lceil \square \rceil$ denotes a round up operation. Consistent with existing LTE, Ng may be configured to be 8. If N can be divided by Ng with no remainder, an integer number of groups are divided. Otherwise, $\lfloor N/Ng \rfloor$ groups including $N_g$ ePHICH resources and one group including N mod $N_g$ ePHICH resources are divided, wherein $\lfloor \square \rfloor$ denotes a round down operation. When there is a remainder, although there is one ePHICH group (generally the last group) in the eCCE has relatively less ePHICH resources, it is still possible to allocate PHICH resources for the UE, if this group has $N_g$ ePHICH resources, e.g., map according to the minimum PRB index and $n_{DMRS}$ of the PUSCH. The base station scheduler ensures that the unavailable ePHICH bits are not allocated to the UE.

If the REs on the eCCE are divided into multiple sub-groups and the joint coding is performed respectively to the ePHICH bits of each sub-group, the above-described method for dividing the ePHICH groups can still be used, i.e., the sub-groups are broken and the ePHICH groups are divided on all ePHICH bits of the eCCE. Alternatively, it is also possible to establish a corresponding relationship between the sub-groups divided on the eCCE and the ePHICH groups. Specially, the ePHICH bits of each sub-group map to one ePHICH group correspondingly.

If multiple eCCEs of the ePDCCH set are used for ePHICH transmission, the ePHICH information bits on each eCCE may be grouped according to the above method. Then, each ePHICH group on multiple eCCEs used for ePHICH may be indexed in association. Alternatively, the ePHICH bits can be borne on all the eCCEs used for ePHICH may be indexed in association, and then ePHICH groups are divided. Herein, if the number of ePHICH bits on all the eCCE used for ePHICH can be divided by $N_g$ without a remainder, each ePHICH group includes $N_g$ ePHICH bits; otherwise, there is one ePHICH group that includes less than $N_g$ ePHICH information bits.

EXAMPLE 3

LTE Release-10/11 defines Channel Information Reference Signal (CSI-RS). A Rank Indication (RI), a Precoding Matrix Index (PMI), and a Channel Quality Indicator (CQI)

that the user must feed back to the base station may be calculated through measuring the CSI-RS. The distributions of the CSI-RS in the time domain and the frequency domain are both sparse. In the frequency domain, the CSI-RS is wideband transmitted. A density in which one resource block includes only one CSI-RS of each antenna port of a serving cell should be ensured. In the time domain, CSI-RS requires a periodicity of multiples of 5 ms, ranging from 5 ms to 80 ms. The sparse CSI-RS supports 8-antenna configuration of the base station. Within one PRB pair, there are altogether 40 RE resources/20 RE resource pairs that are available for the CSI-RS configuration.

In the LTE Release-10/11, the system may configure the CSI-RS with a zero transmission power (i.e., as a Zero-Power CSI-RS (ZP CSI-RS), so as to reduce the inter-cell CSI-RS interference and increase the accuracy ratio of CSI-RS measurement. The ePHICH may be borne by the time-frequency resources configured as the ZP CSI-RS. With this method, the Rel-11 UE determines that the REs that the ePHICH occupies are the ZP CSI-RS, thus the Rel-11 UE does not detect the ePDCCH on these REs, which avoids the affection to the ePDCCH of the Rel-11 UE.

Figure 11A:
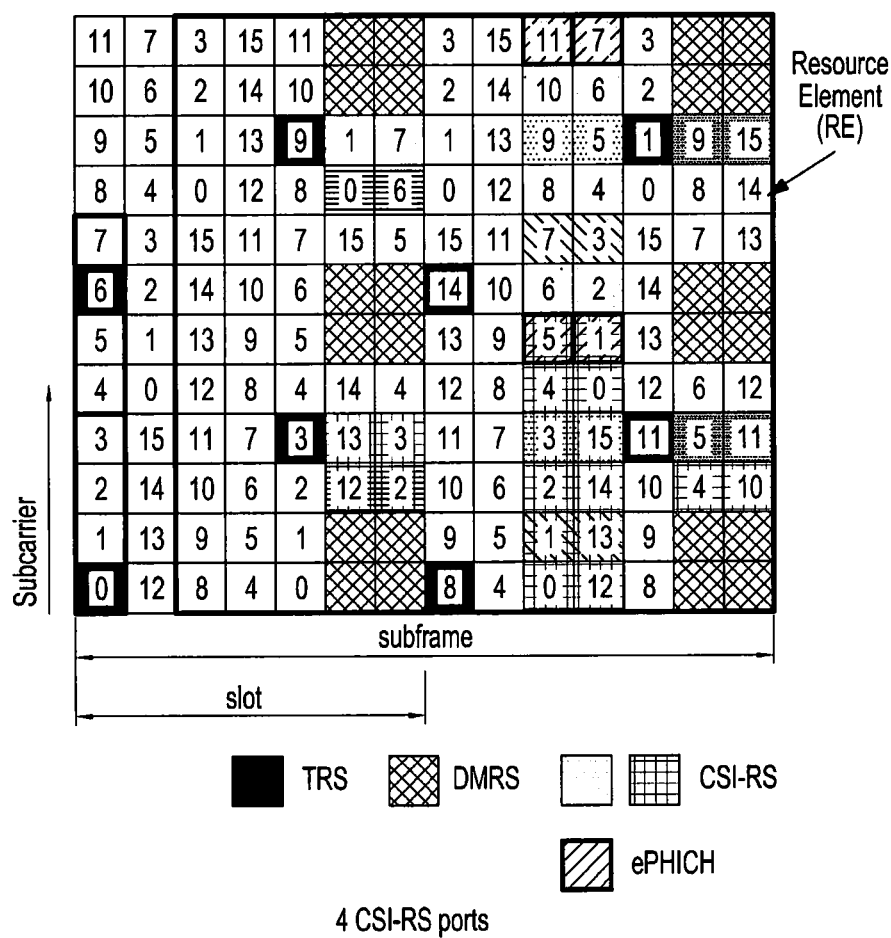
FIG. 11A and FIG. 11B are diagrams illustrating a fifth configuration of ePHICH time-frequency resources according to an embodiment of the present invention.
Figure 11B:
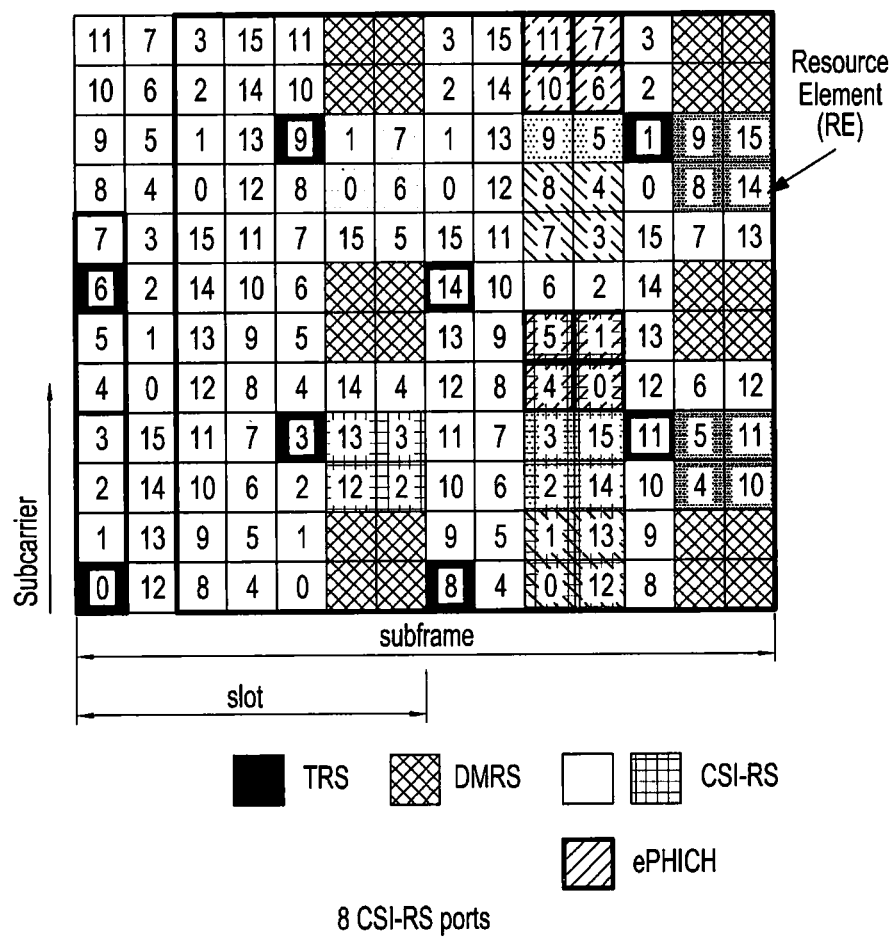

FIG. 11A and FIG. 11B are diagrams illustrating a fifth configuration of ePHICH time-frequency resources according to an embodiment of the present invention FIG. 11A and FIG. 11B show ePHICH channels of a frame structure with a normal CP according to an embodiment of the present invention. Suppose that the time-frequency structure of the DMRS and the time-frequency structure of the CSI-RS in the existing LTE system are adopted, and suppose that the TRS uses the time-frequency structure of the existing CRS port 0. According to the design of the LTE TDD system, for a normal subframe, the last two OFDM symbols of slot 0 and OFDM symbols 3, 4, 6 7, of slot 1 may be used for configuring and transmitting the CSI-RS.

As shown in FIG. 11A, suppose that the base station configures a group of 4-port ZP CSI-RSs for the ePHICH. For example, on each PRB pair, there is a pair of CSI-RS resources that occupy 4 REs on OFDM symbols 3 and 4 of slot 1. These four pairwise consecutive REs correspond to one traditional defined REG in number. Then, the REGs borne on different PRB pairs form the ePHICH transmission resource and ensure the frequency diversity gain. Alternatively, as shown in FIG. 11B, suppose that the base station configures two groups of 4-port CSI-RS time-frequency resources for the ePHICH, and the two groups of 4-port CSI-RS time-frequency resources form a group of 8-port CSI-RS time-frequency resources. Thus, every 4 REs that are adjacent to each other on time and frequency domains correspond to one traditionally defined REG. then, the REGs borne on different PRB pairs form the ePHICH transmission resource and ensure the frequency diversity gain.

The above describes the method for transmitting HARQ indication information provided by the examples of the present invention. Corresponding to the above method, an embodiment of the present invention also provides an apparatus which is described hereinafter.

Figure 12:
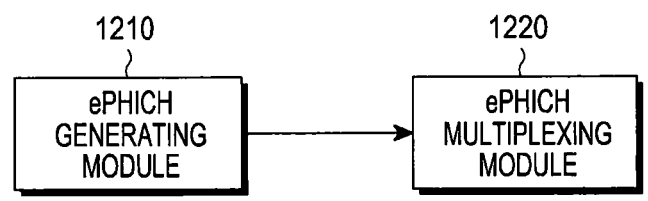
FIG. 12 is a diagram illustrating a base station device for transmitting the ePHICH according to an embodiment of the present invention.

FIG. 12 is a diagram illustrating a structure of a base station device for transmitting ePHICH signals according to an embodiment of the present invention. Referring to FIG. 12, the device includes an ePHICH generating module 1210 and an ePHICH multiplexing module 1220, wherein:

the ePHICH generating module 1210 is adapted to perform operations such as coding, rate matching and modulating to the ePHICH; and the ePHICH multiplexing module 1220 is adapted to map ePHICH resources borne ePHICH information to some time-frequency resources of a distributed ePDCCH set according to the method described above, and transmit the generated ePHICH information on the ePHICH resources.

Figure 13:
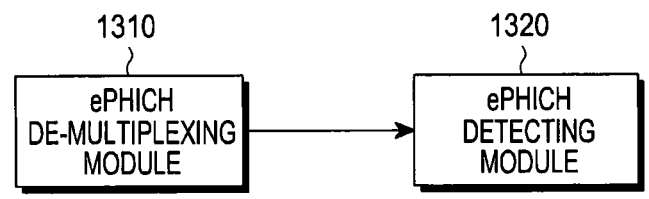
FIG. 13 is a diagram illustrating a UE device for receiving the ePHICH according to an embodiment of the present invention.

FIG. 13 is a diagram illustrating a structure of a UE device for receiving ePHICH according to an embodiment of the present invention. Referring to FIG. 13, the device includes an ePHICH de-multiplexing module and an ePHICH detecting module, wherein:

the ePHICH de-multiplexing module 1310 is adapted to de-multiplex on the ePHICH resources used for bearing the ePHICH information according to the method described above to obtain the ePHICH; and the ePHICH detecting module 1320 is adapted to perform operations such as demodulating and decoding to the ePHICH signals.

While the invention has been shown and described with reference to certain embodiments thereof, it will be understood by those skilled in the art that various changes in form and detail may be made therein without departing from the spirit and scope of the invention as defined by the appended claims and their equivalents.

The invention claimed is:

1. A method for transmitting Hybrid Automatic Repeat ReQuest (HARQ) indication information, comprising:

transmitting, by a UE, uplink data on a Physical Uplink Shared CHannel (PUSCH) according to scheduling of a base station;

detecting, by the UE, a new UpLink (UL) grant and enhanced Physical HARQ Indication CHannel (ePHICH) information of the base station for the uplink data according to a synchronous HARQ timing relationship, wherein the UE retransmits the uplink data or suspends transmission of the uplink data based on an indication of the ePHICH information, when the UL grant is not detected, wherein ePHICH resources used for bearing the ePHICH information are mapped to a portion of time-frequency resources of a distributed enhanced Physical Downlink Control CHannel (ePDCCH) set, wherein in the distributed ePDCCH set, the ePHICH resources are mapped on multiple Physical Resource Block (PRB) pairs and occupy at least one Resource Element Group (REG) on each PRB pair, and wherein Orthogonal Frequency Division Multiplexing (OFDM) symbols of the time-frequency resources of the distributed ePDCCH set on which the ePHICH resources are mapped include OFDM symbols in a subframe except for OFDM symbols used for or may be used for a Demodulation Reference Signal (DMRS) and a Channel State Indication Reference Signal (CSI-RS).

2. The method of claim 1, wherein the ePHICH resources are mapped on four PRB pairs.

3. The method of claim 1, wherein the OFDM symbols used for or may be used for CSI-RS include all of the OFDM symbols may be used for the CSI-RS in a duplex mode system that the UE is located, or OFDM symbols which can be used for bearing the CSI-RS in both a Frequency Division Duplex (FDD) system and a Time Division Duplex (TDD) system.

4. The method of claim 1, wherein if the OFDM symbols of the time-frequency resources of the distributed ePDCCH set on which the ePHICH resources are mapped are used for transmitting a Tracking Reference Signal (TRS), REGs are configured such that REs corresponding to Common Reference Signal (CRS) ports 0 and 1 are not used for transmitting the ePHICH information and Resource Elements (REs) corresponding to the CRS port 1 are used for transmitting the ePDCCH.

5. The method of claim 1, further comprising:
calculating the number of OFDM symbols to be occupied by all ePHICH resources in advance according to the total amount of ePHICH resources to be reserved; and
allocating the OFDM symbols used for transmitting the ePHICH according to the number of OFDM symbols,
wherein only some REGs of at most one OFDM symbol are not occupied by the ePHICH.

6. The method of claim 5, wherein when the OFDM symbols used for transmitting the ePHICH are allocated, a number N OFDM symbols at a forefront of the subframe are allocated to transmit the ePHICH, wherein N is the number of OFDM symbols to be occupied, and
when the ePDCCH is configured for a Rel-11 UE, configuring that the ePDCCH is transmitted from the nth OFDM symbol of the subframe, wherein n≥N.

7. The method of claim 5, wherein when the OFDM symbols are allocated for transmitting the ePHICH, the OFDM symbols used for transmitting the ePHICH are allocated according to a time sequence of the OFDM symbols, or are allocated according to a reverse order of the time sequence of the OFDM symbols.

8. The method of claim 5, wherein one ePHICH resource occupies REGs on same time-frequency locations of different PRB pairs.

9. The method of claim 5, wherein one ePHICH resource occupies REGs on different time-frequency locations of different PRB pairs.

10. The method of claim 9, wherein when the REGs occupied by the ePHICH resources are allocated, the ePHICH resources occupy the same number of REs on each enhanced Control Channel Element (eCCE) of the ePDCCH set.

11. The method of claim 1, further comprising:
predefining a set of OFDM symbols available for transmitting the ePHICH; and
allocating the ePHICH resources on the OFDM symbols in the set.

12. The method of claim 1, wherein the time-frequency resources of the distributed ePDCCH set on which the ePHICH resources are mapped include time-frequency resources of at least one enhanced Control Channel Element (eCCE) in the distributed ePDCCH set.

13. The method of claim 12, wherein the eCCEs used for the ePHICH are semi-statically configured by the base station or dynamically configured, and
if the eCCEs are dynamically configured by the base station, if one eCCE currently does not bear the ePHICH, the eCCE is used dynamically for transmitting the ePDCCH.

14. The method of claim 12, wherein mapping the ePHICH resources on the time-frequency resources of at least one eCCE comprises:
performing a joint coding, a rate matching and a Quadrature Phase Shift Keying (QPSK) modulation to a number N ePHICH information bits borne by one eCCE, and mapping the ePHICH information bits to each RE of the at least one eCCE.

15. The method of claim 14, wherein a fixed number of ePHICH information bits are transmitted on each eCCE or each sub-group divided on the eCCE.

16. The method of claim 15, wherein the ePHICH information is transmitted on some of the bits according to the number of available REs of the eCCE or the sub-group.

17. The method of claim 12, wherein mapping the ePHICH resources on the time-frequency resources of the at least one eCCE comprises:
dividing RE resources of the at least one eCCE into sub-groups,
performing a joint coding, a rate matching, and a QPSK modulation to the ePHICH information bits transmitted in one sub-group and mapping the ePHICH information bits to each RE in the sub-group.

18. The method of claim 17, wherein the RE resources are divided into sub-groups in which one RE is a unit.

19. The method of claim 17, wherein dividing the RE resources of the at least one eCCE into sub-groups comprises:
separating an I-branch and a Q-branch of a modulated symbol of each RE of the eCCE;
dividing I-branches of all RE resources into one sub-group; and
dividing Q-branches of all RE resources into another sub-group.

20. The method of claim 17, further comprising:
dividing the ePHICH information bits borne on each eCCE into ePHICH groups in advance, wherein the ePHICH groups corresponding to the sub-groups of the RE resources.

21. The method of claim 12, further comprising:
dividing the ePHICH information bits borne by each eCCE into ePHICH groups.

22. The method of claim 21, wherein the dividing the ePHICH information bits borne by each eCCE into ePHICH groups comprises: dividing all ePHICH information bits borne by each eCCE into ⌈N/Ng⌉ ePHICH groups, wherein if N mod $N_g$ =0, each ePHICH group comprises Ng ePHICH information bits, and
if N mod $N_g$ ≠0, among the ⌈N/Ng⌉ ePHICH groups divided, one ePHICH group comprises N mod $N_g$ effective ePHICH information bits, other ePHICH groups comprises $N_g$ effective ePHICH information bits.

23. The method of claim 22, wherein the ePHICH resources are mapped according to a principle that each ePHICH group comprises Ng ePHICH information bits.

24. The method of claim 1, wherein the time-frequency resources of the distributed ePDCCH set on which the ePHICH resources are mapped include time-frequency resources configured as a Channel Station Indication Reference Signal (CSI-RS).

25. A base station device, comprising:
an enhanced Physical HARQ Indication CHannel (ePHICH) generating module, adapted to perform operations including coding, rate matching and modulating to an ePHICH; and
an ePHICH multiplexing module, adapted to map ePHICH resources bearing ePHICH information to a portion of time-frequency resources of a distributed ePDCCH set, and transmit the generated ePHICH information on the ePHICH resources,
wherein in the distributed ePDCCH set, the ePHICH resources are mapped on multiple Physical Resource Block (PRB) pairs and occupy at least one Resource Element Group (REG) on each PRB pair, and
wherein Orthogonal Frequency Division Multiplexing (OFDM) symbols of the time-frequency resources of the distributed ePDCCH set on which the ePHICH resources are mapped include OFDM symbols in a subframe except for OFDM symbols used for or may be used for a Demodulation Reference Signal (DMRS) and a Channel State Indication Reference Signal (CSI-RS).

26. A user device, comprising:

an enhanced Physical HARQ Indication CHannel (ePHICH) de-multiplexing module, adapted to de-multiplex ePHICH resources used for bearing ePHICH information, in order to obtain the ePHICH information, wherein the ePHICH resources are mapped to a portion of time-frequency resources of a distributed ePDCCH set; and an ePHICH detecting module, adapted to demodulate and decode the ePHICH information, wherein in the distributed ePDCCH set, the ePHICH resources are mapped on multiple Physical Resource Block (PRB) pairs and occupy at least one Resource Element Group (REG) on each PRB pair, and wherein Orthogonal Frequency Division Multiplexing (OFDM) symbols of the time-frequency resources of the distributed ePDCCH set on which the ePHICH resources are mapped include OFDM symbols in a subframe except for OFDM symbols used for or may be used for a Demodulation Reference Signal (DMRS) and a Channel State Indication Reference Signal (CSI-RS).

* * * * *